(12) United States Patent
Canney (10) Patent No.: US 7,744,481 B2
(45) Date of Patent: Jun. 29, 2010

(54) METHOD FOR ACHIEVING AN OPTIMAL GOLF STANCE

(76) Inventor: Peter Laurence Canney, 1 Maltravers Road, Ivanhoe East, Melbourne, Victoria 3079 (AU)

( * ) Notice: Subject to any disclaimer, the term of this patent is extended or adjusted under 35 U.S.C. 154(b) by 835 days.

(21) Appl. No.: 11/371,458

(22) Filed: Mar. 9, 2006

(65) Prior Publication Data

US 2006/0205527 A1    Sep. 14, 2006

(30) Foreign Application Priority Data

Mar. 9, 2005    (AU) ............................. 2005901149

(51) Int. Cl.
    A63B 69/36    (2006.01)
(52) U.S. Cl. ..................................... 473/219
(58) Field of Classification Search ................ 473/219, 473/409
    See application file for complete search history.

(56) References Cited

U.S. PATENT DOCUMENTS

| | | | | |
|---|---|---|---|---|
| 5,839,968 A | * | 11/1998 | Latella | 473/219 |
| 6,059,668 A | * | 5/2000 | Marley, Jr. | 473/220 |
| 6,176,790 B1 | * | 1/2001 | Latella | 473/219 |
| 6,500,075 B1 | * | 12/2002 | McDevitt | 473/272 |
| 2002/0016214 A1 | * | 2/2002 | Hueber | 473/287 |
| 2003/0232701 A1 | * | 12/2003 | Latella, Jr. | 482/92 |
| 2006/0205527 A1 | * | 9/2006 | Canney | 473/270 |
| 2007/0243942 A1 | * | 10/2007 | Elliott | 473/220 |
| 2008/0119299 A1 | * | 5/2008 | Merrill | 473/212 |

* cited by examiner

Primary Examiner—Raleigh W. Chiu
(74) Attorney, Agent, or Firm—Workman Nydegger (57) ABSTRACT

According to the present invention there is provided a method for positioning a person in an optimal stance for hitting a golf ball along an intended path toward a target. The method including the steps of:
(a) holding an end of a golf club in one hand that is used by the person as a lower hand in a conventional golf grip;
(b) positioning the club such that a striking surface of the club faces the target and is spaced behind the ball relative to the target;
(c) placing both feet side-by-side at a distance from the ball and lateral to the intended path;
(d) orienting the person's arm by which the club is held so as to locate the person's elbow of the arm as close as possible to the navel and/or spine of the person;
(e) re-gripping the club with both hands; and
(f) moving said feet apart so as to locate the front foot further forward of the ball and said back foot further rearward of the ball prior to swinging the club.

11 Claims, 12 Drawing Sheets

METHOD FOR ACHIEVING AN OPTIMAL GOLF STANCE

CROSS-REFERENCE TO RELATED APPLICATIONS

This application claims priority to Australian Patent Application No. 2005901149, filed Mar. 9, 2005, which application is incorporated herein by specific reference.

BACKGROUND OF THE INVENTION

1. The Field of the Invention

The present invention relates to a method for positioning a person in an optimal stance for striking a golf ball. The present invention also embraces an information carriers such as, but by no means limited to, videos, books, DVD's and other information storage mediums on which the method of the invention has been recorded or stored.

It is widely accepted that the ability to repeatedly strike a golf ball in a controlled and desired manner is to a very large extent determined by the initial stance position of the golfer. Therefore, before moving the golf club through the various phases of a golf swing; namely the takeaway, downswing and follow-through, it is important to be able to repeatedly assume a good stance position for striking a golf ball.

2. The Relevant Technology

The present invention is aimed at providing a series of straightforward steps that can be routinely followed by a golfer of any level of ability to achieve an optimal stance for striking a golf ball.

SUMMARY OF THE INVENTION

According to the present invention there is provided a method for positioning a person in an optimal stance for hitting a golf ball along an intended path toward a target, the method including the steps of:

(a) holding an end of a golf club in one hand that is used by the person as a lower hand in a conventional golf grip, in the case of a right handed golfer said hand will be the right hand and in the case of a left handed golfer said hand will be the left hand;

(b) positioning the club such that a striking surface of the club faces the target and is spaced behind the ball relative to the target;

(c) placing both feet side-by-side at a distance from the ball and lateral to the intended path, wherein a front foot closest to the target is located substantially forward of the ball and a back foot furthest from the target is located substantially rearward of the ball;

(d) orienting the person's arm by which the club is held so as to locate the person's elbow of the arm as close as possible to the navel and/or spine of the person;

(e) re-gripping the club with both hands using a conventional golf grip;

(f) moving said feet apart so as to locate the front foot further forward of the ball and said back foot further rearward of the ball prior to swinging the club.

It will be appreciated by those skilled in the art of the present invention that the steps of the present invention need not necessarily be carried out in the order mentioned above. Specifically, it is possible for two or more of the steps to be carried out simultaneously, disjunctively or in a completely different order to the order mentioned above. For example, it is possible that steps (b) and (c) may be carried out simultaneously or that step (c) be carried prior to step (b). Yet another example is that steps (d), (e) and (f) may be carried out simultaneously. However, in order to maintain consistency and produce the best results, it is recommended that the golfer carry out the steps in the same sequence each time they address the ball.

It will also be appreciated by those skilled in the art of the present invention that the term "conventional golf grip" embraces a number of the difference types of grips including, but by no means limited to: the Varden grip made famous by Henry Varden; the interlocking grip made famous by Jack Nicklaus; the ten finger or baseball grip; the interweaving grip made famous by Greg Norman; and overlapping grips in which one or more than one finger of the bottom hand overlaps the upper hand.

By following the steps of the present invention a golfer should be able to achieve an optimal stance for all types of clubs and shots that the golfer may wish to play. For example, the stance provided by the present invention is suited for driving from a tee, fairway shots, bunker shots, pitching, chipping and even putting.

It is preferred that the club face be spaced behind the ball according to step (b) at a spacing that is approximately equal to the distance between a naval of the person and a vertical axis extending through a hip joint of the person.

It is preferred that the step of positioning the club behind the ball relative to the target according to step (b) includes positioning the club over a range from 3 to 15 cm behind the ball. It will be appreciated that this range is a biomechanical measurement that equates to approximately to the spacing between the navel and a vertical axis through the hip joint for people of varying sizes and ages.

It is even more preferred that the club be positioned over a range from 3 to 12 cm behind the ball.

It is even further preferred that the club be positioned over a range from 3 to 5 cm behind the ball.

It is preferred that placing both feet side-by-side in accordance with step (c) involves placing the person's feet together.

It is preferred that placing both feet side-by-side at a distance from the ball in accordance with step (c) includes aligning approximately the centre of the back foot with the centre of the spacing between the striking surface of the club and the ball. By following this procedure, the hip joint of the person furthest from the ball will be approximately aligned with the club head and the person's navel will be approximately aligned with the ball.

It will also be appreciated that the distance at which the person's feet are placed from the ball in accordance with step (c) is dependent on the type of club and the type of shot intended to be played. For example, in the situations when 9 iron is being used to strike the ball, the person's feet will need to positioned closer to the ball then when a 4 iron is being used to allow sufficient room to swing the club. As a general rule of thumb, it is recommended that the spacing between a top of the club and a person's leg be in the range from 5 to 15 cm immediately prior to swinging the club.

When the person is orienting their arm so that their elbow is positioned as close as possible to their navel and/or spine, a useful check that can be simply carried out is to ensure that the person's thumb of their hand holding the club points toward the ball.

It is preferred that the orientation of the person's arm carried out by step d) be substantially maintained until the beginning of a golf swing.

It is preferred that when carrying out step (e), the arm of the upper hand used for gripping the upper end of the club is held relatively straight so that the shaft of the club and the person's arm are co-planer.

When moving the person's feet apart according to step (f), it is preferred that the feet be spread at least as wide as the person's shoulders.

It is even more preferred that an inside arch section of each foot be located outside each shoulder of the person.

According to the present invention there is also provided an electronic device such as but by no means limited to: a computer, CD or DVD player or any other visual and/or audio display that presents information for positioning a person in an optimal stance for hitting a golf ball in accordance with method steps (a) to (f) mentioned above. Optionally, the electronic device may also contain information on any one or more of the preferred features described above.

According to the present invention there is also provided an information carrier such as but by no means limited to: computer readable optical mediums including CDs and DVDs; videos; books and other printed literature on which information for positioning a person in an optimal stance hitting a golf ball in accordance with method steps a) to f) mentioned above. Optionally, the information carrier may also contain information on any one or more of the preferred features described above.

BRIEF DESCRIPTION OF THE DRAWINGS

A preferred embodiment of the method of the present invention will now be described with reference to the accompanying figures, of which.

DETAILED DESCRIPTION OF THE PREFERRED EMBODIMENTS

FIGS. 2 to 7 illustrate a sequence of steps of the present invention as would be carried out by a right handed golfer. However, it will be appreciated by those skilled in the art of the present invention that the same sequence of the steps may also be carried out be a left handed golfer. Specifically, the steps taken a left handed golfer in carrying out the method will essentially be a mirror image of the sequence of the steps shown in FIG. 2 through to FIG. 7.

By way of example, the method of the present invention will now be described in detail with reference to the figures. The features illustrate the method in discrete and separate steps, however, this need not necessarily be the case. For instance, it is possible for two or more steps to be carried out simultaneously or to be carried out in a different order to that described below.

Figure 1:
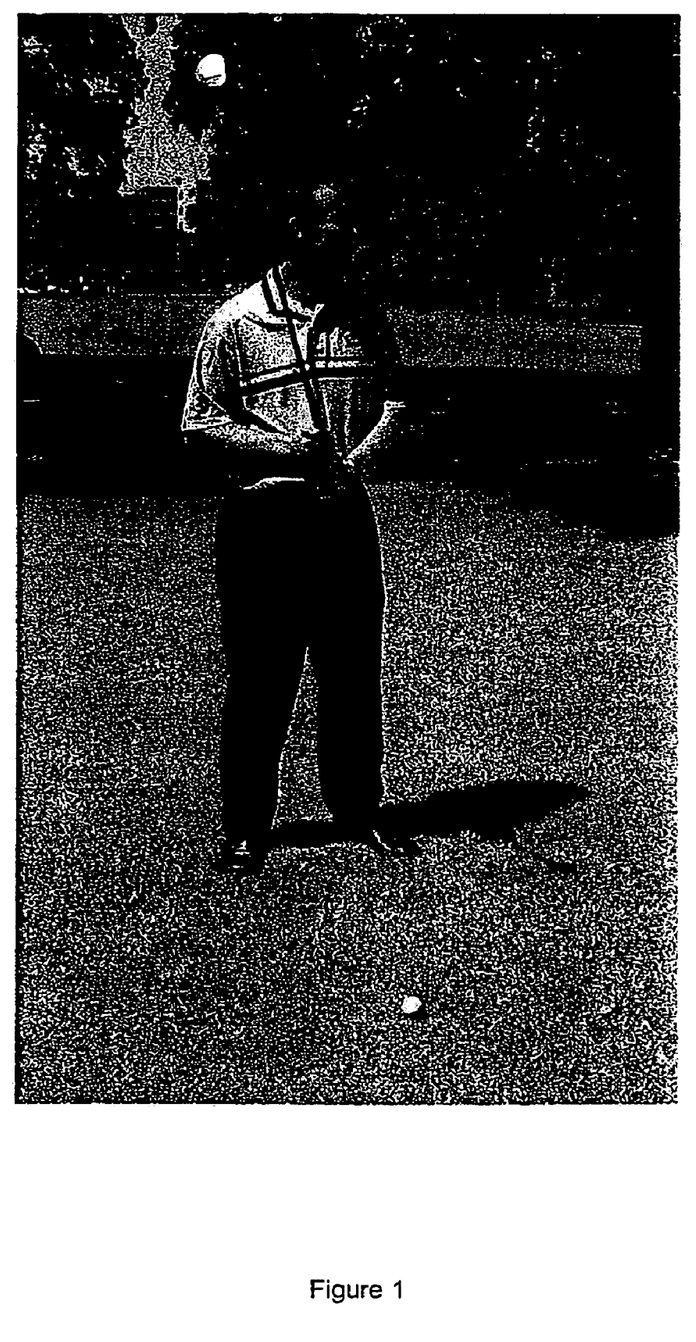
FIG. 1 is a photo of a right handed golfer holding the golf club in 2 hands prior to carrying out the steps of the method according to the preferred embodiment.

FIG. 1 shows a right handed golfer holding the club in two hands prior to taking a stance for striking a golf ball.

Figure 2:
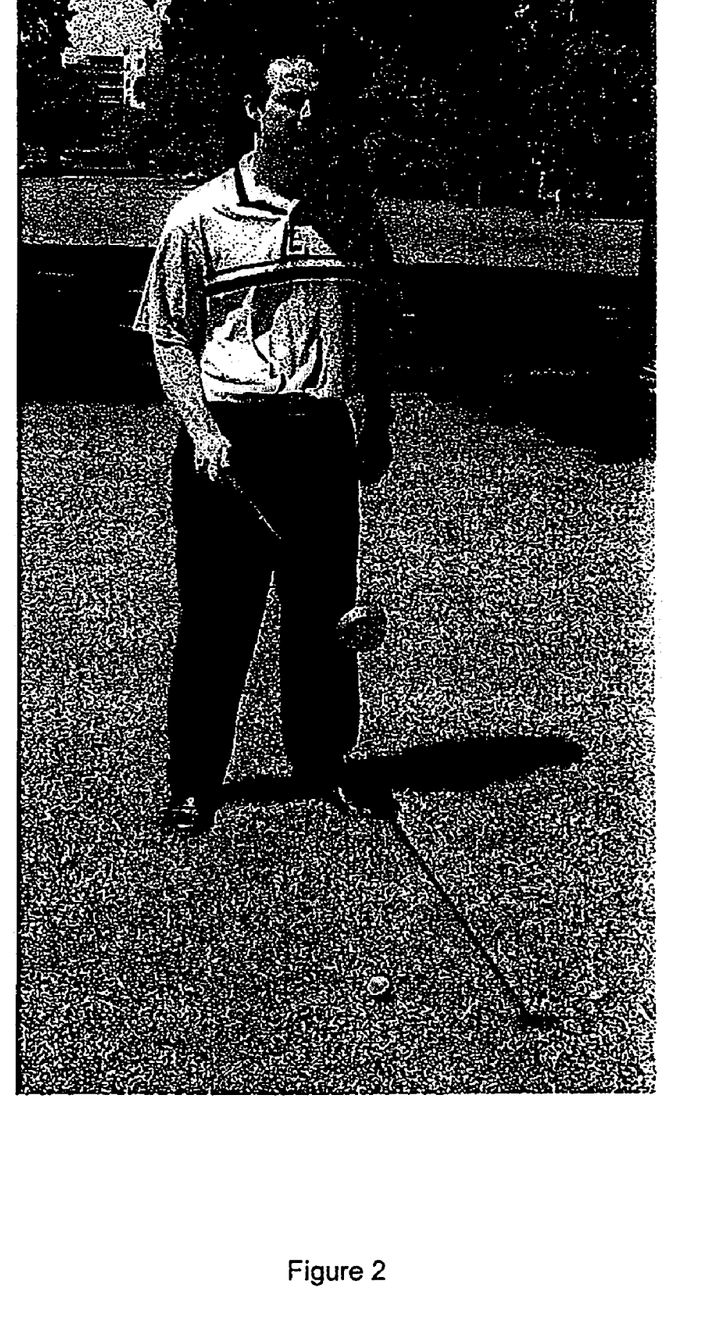
FIG. 2 is a photo of the golfer holding the club an end of the club in their right hand in accordance with the first step of the method.

FIG. 2 shows the first step of the preferred embodiment and involves the golfer holding the upper end of the club in their right hand.

Figure 3:
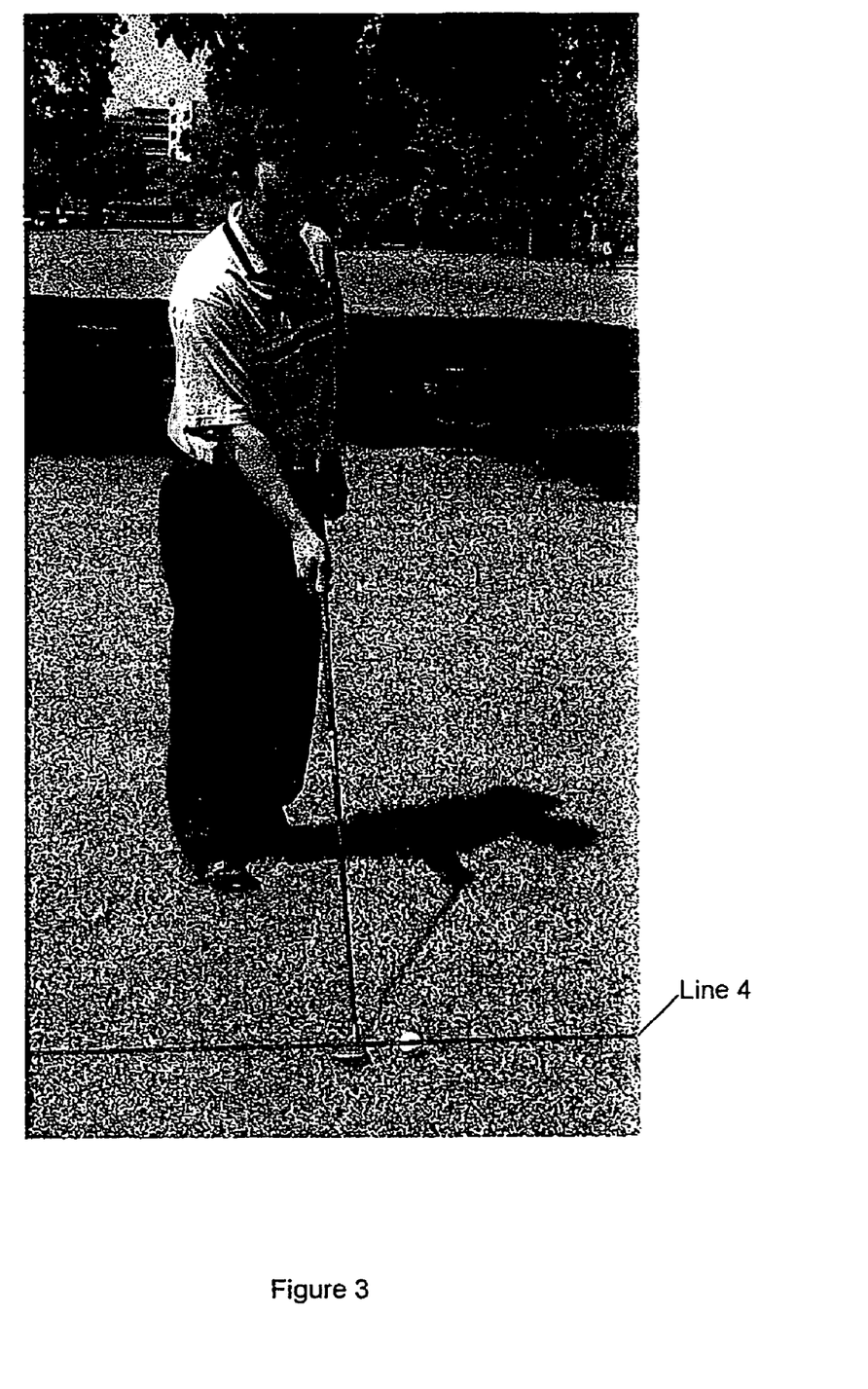
FIG. 3 is a photo of the golfer positioning the club such that the striking surface of the club faces the target and spaced behind the ball relative to the target in accordance with the second step of the method.

FIG. 3 shows the next step which involves the golfer positioning the striking surface of the club approximately 3 to 8 cm behind the ball with the striking surface facing the target and along a desired flight path identified by line A. It will be appreciated that the intended flight path may not necessarily be directly to the target but may in fact be to the left or right of the target if a cross wind needs to be taken into account or that the ball will be hit with a draw or fade.

Figure 4:
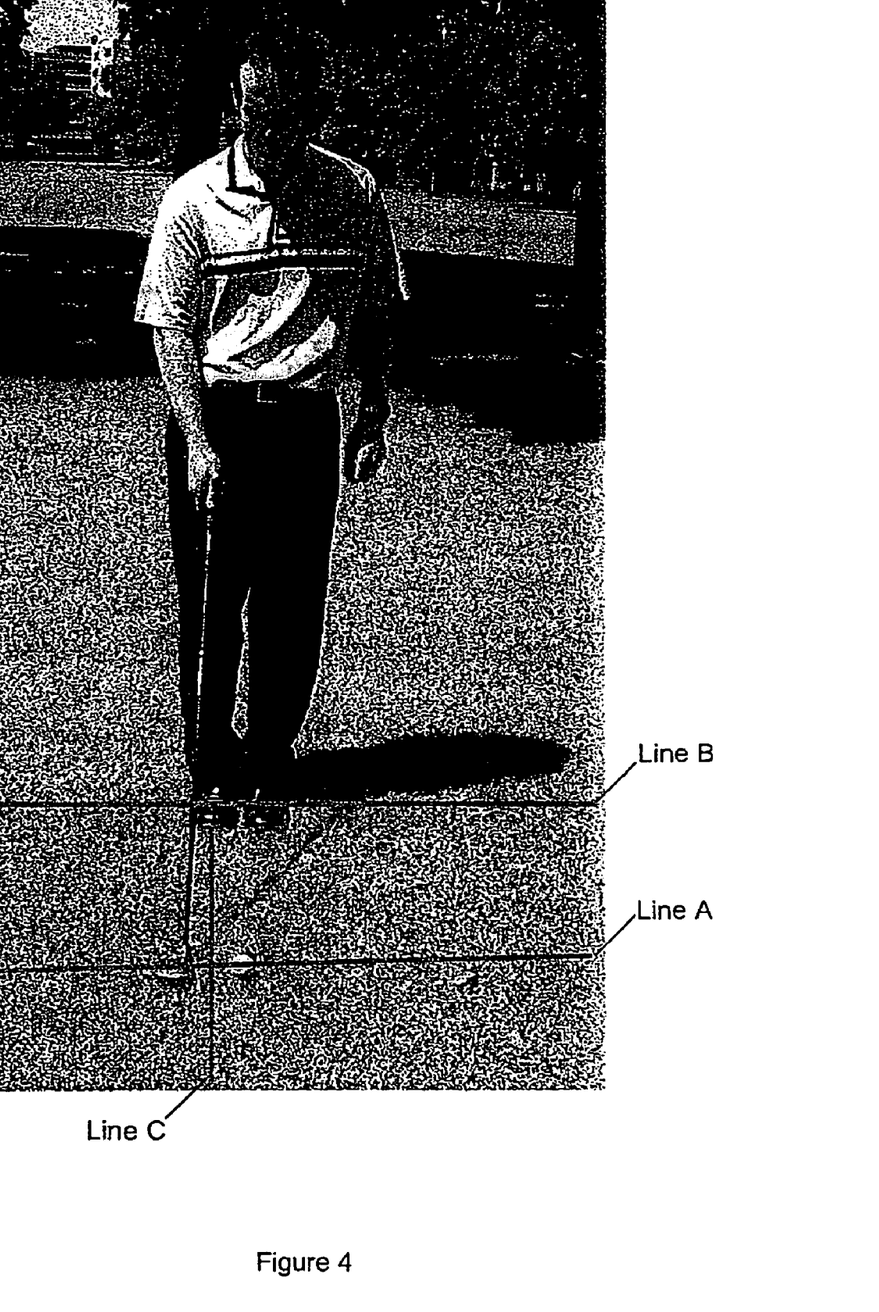
FIG. 4 is a photo of the golfer placing their feet side-by-side and lateral to the intended target line in accordance with the third step of the method.

FIG. 4 shows the following step in which the golfer steps up to the ball and positions their body at a distance from the ball with their feet lateral to the intended path of the ball. By taking this position, the golfer's torso as view in direction from shoulder to shoulder is located approximately parallel to the intended path of the ball along line B.

The distance the feet are position laterally of the ball depends on the length of the club being used and the intended shot to be played.

In addition, FIG. 4 also shows that the golfer's feet are position together side-by-side and that the front foot is located substantially forward of the ball and that the back foot is located substantially rearward of the ball and the back foot is aligned approximately with the centre of the spacing between the ball of the striking surface of the ball along line C.

Figure 5:
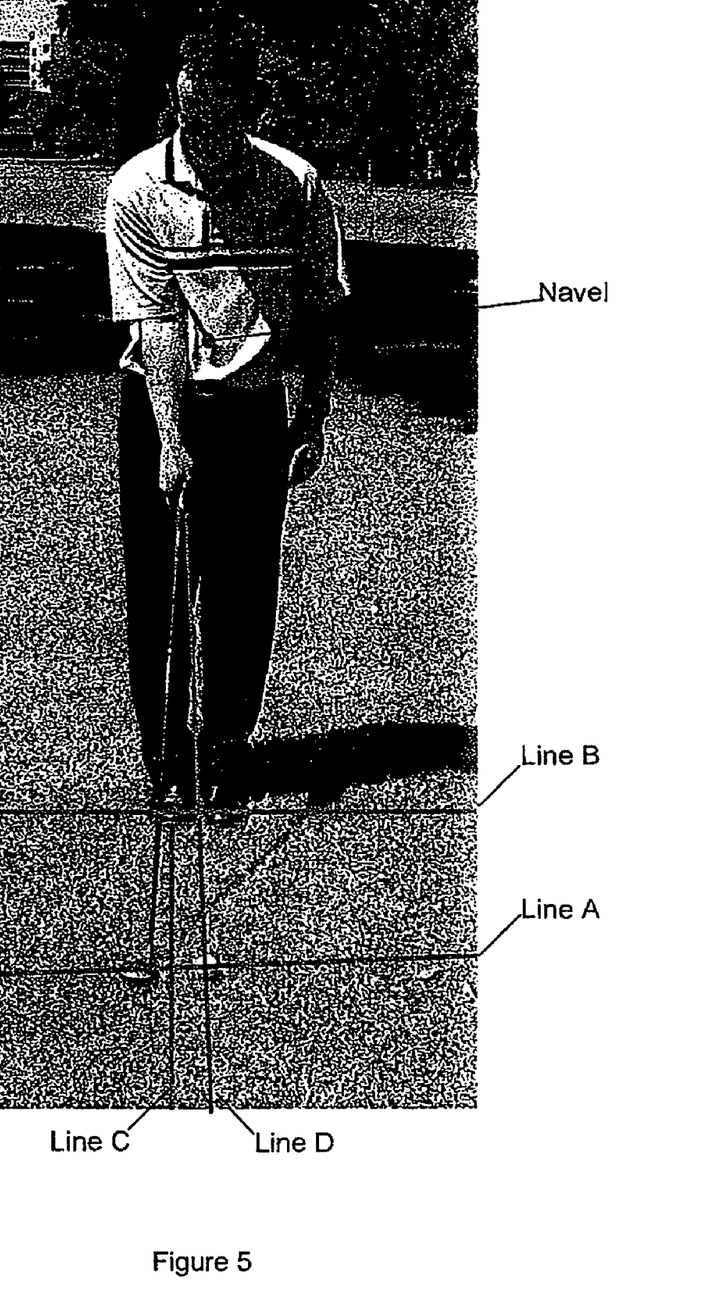
FIG. 5 is a photo in which the right arm is being oriented to locate their elbow as close as possible to their navel in accordance with the fourth step of the method.

FIG. 5 shows the next step in which the orientation of the arm holding the club is changed so that the elbow is located as close as possible to the navel or centre of the abdomen of the golfer. As can be seen in FIG. 5, is useful check to ensure that the club is held appropriately in the right hand is if the thumb of the right hand points toward the ball along line D.

As can be seen in FIG. 5, it is important that that the orientation or position of the golfer's body resulting from the steps shown in the FIGS. 2 to 4 be maintained while the golfer's elbow is position as close as possible to their navel and the line of their spine.

Figure 6:
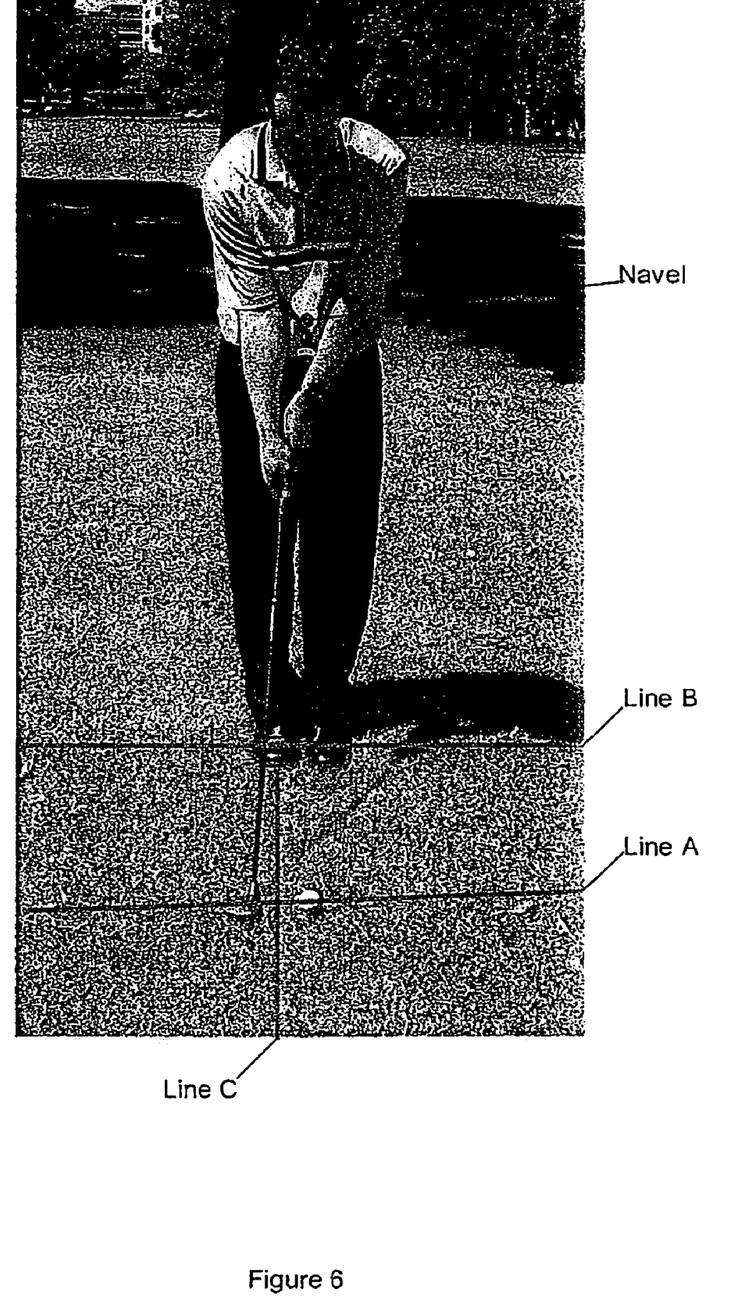
FIG. 6 is a photo in which the they have re-gripped the club with both hands using a convention grip in accordance with the fifth step of the method.

The penultimate step of the method is to re-grip the club with both hands using a conventional grip as shown in FIG. 6. As has been mentioned earlier in the specification, the term conventional grip has a well known meaning to a person skilled in the art. Re-gripping the club is carried out by moving the right hand on the club down the shaft of the club and placing the left on the upper end of the club. This step is also carried out while substantially maintaining the orientation of the golfer's body by the preceding steps.

Figure 7:
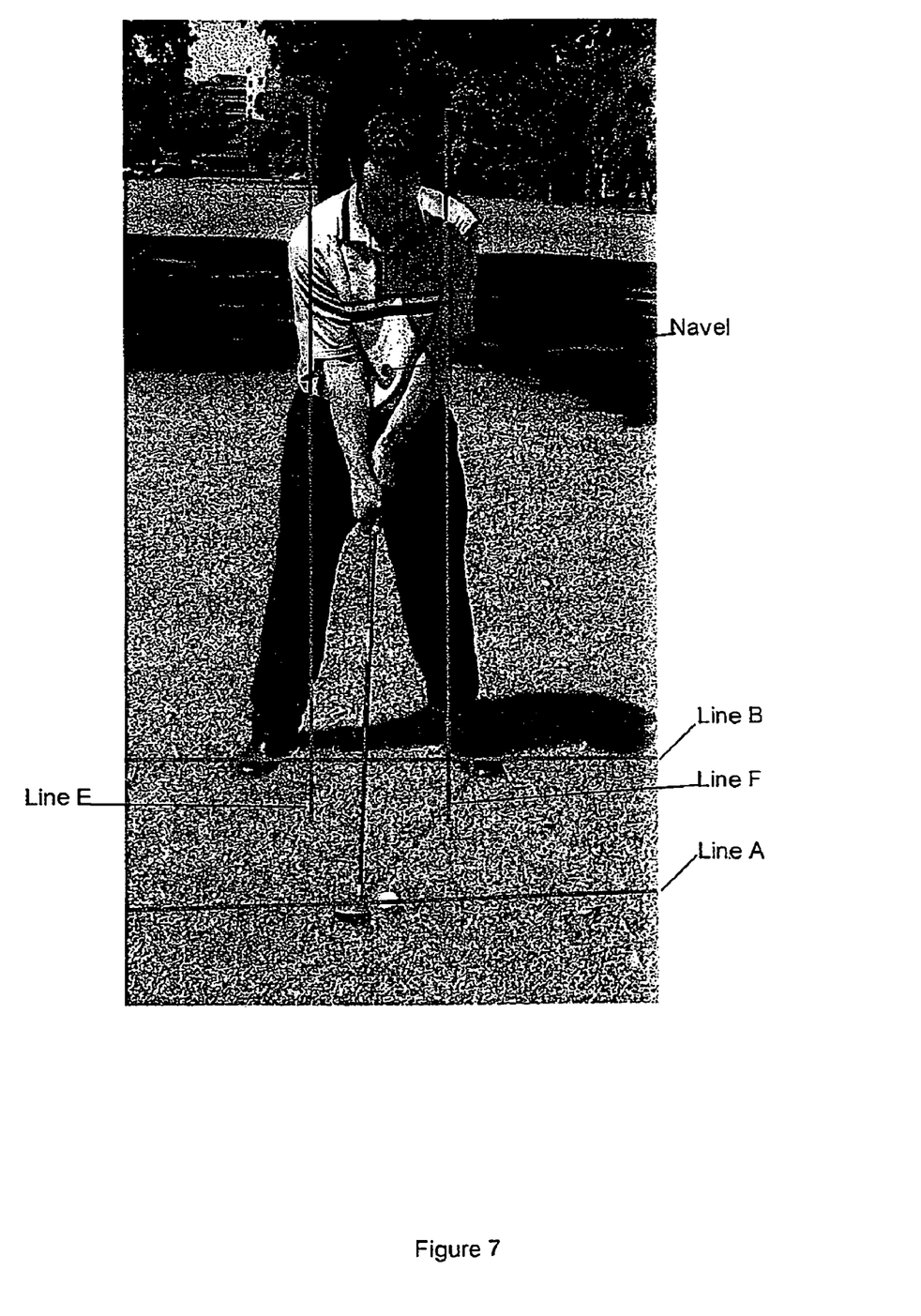
FIG. 7 is a photo in which the golfer has spread their feet to complete their stance for striking the golf ball in accordance with the sixth step of the method.

The final step to complete the method of the preferred embodiment is for the golfer to spread their feet to create a stable footing with the ground for swinging the club as shown in FIG. 7. In the case of most tee and fairway shots, the golfer will separate the feet so that the torso of the golfer when viewed in a direction from shoulder to shoulder lies substantially parallel to the intended ball path along line B. However, in a situations where the intended shot is a bunker shot, the golfer's feet may need to be altered such that their front feet moves away from line B.

The width over which the feet are spread will depend on the club being used to play the shot. In the case where the club selected from playing the shot is a driver, it is recommended that the width by which the feet are separated be such that the inside arch of the feet be located outside the centre of the shoulder of the golfer i.e., the golfer's feet be outside lines E and F.

As can be seen in the FIG. 7, when the club is re-gripped with both hands and the feet spaced apart, the left arm is held essential straight and substantially co-planar with the plane of the club and the knees are bent. Ideally, the planes through the golfer's pelvis and shoulders are approximately parallel and, therefore, avoid placing undue stress of the golfer's spine when taking the stance. Once the golfer has attained the stance position shown in FIG. 7, the golfer is then ready to commence the take away and down swing.

In addition, as a general rule of thumb the distance from the end of the club to the golfer's legs is normally in the order of the 10 to 15 cm to allow sufficient space to swing the club.

Figure 8:
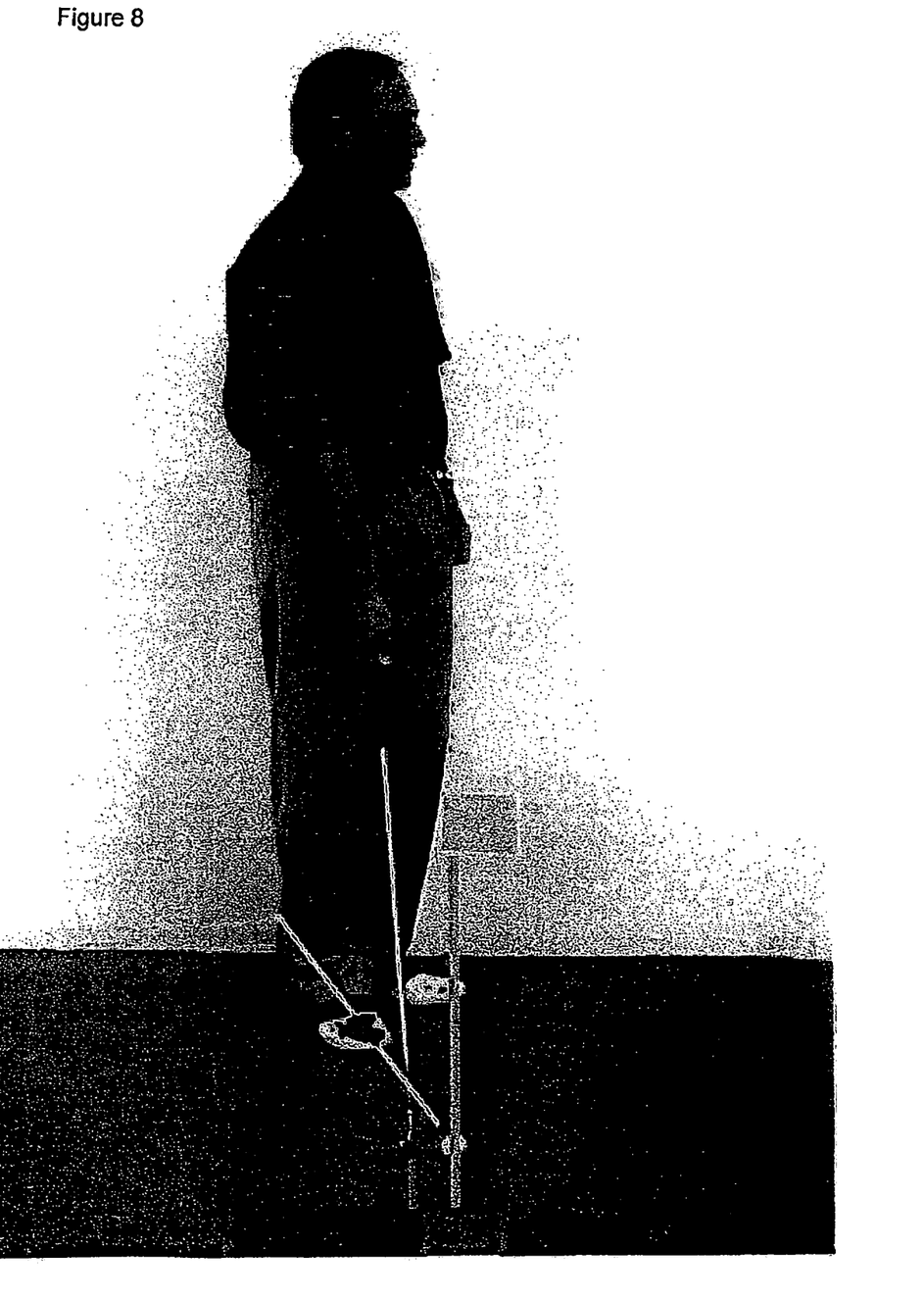
FIGS. 8 to 12 are photos of another golfer showing the same steps as shown in FIGS. 3 to 7 in an alternative sequence.

The sequence of steps shown in FIGS. 3 to 7 have been illustrated in a different and perhaps more streamline sequence in FIGS. 8 to 12 that may be more suitable for use on a golf course. Specifically, FIG. 8 illustrates a right handed golfer holding the upper end of the club in their right hand and the striking surface of the club located approximately 3 to 8 cm behind the ball and facing the target.

From the position shown in FIG. 8, the golfer then places his feet side-by-side with the foot of the golfer closest to the target positioned substantially forward of the ball and their other foot furtherest from the target being placed substantially rearward of the ball. The golfer then orients their arm holding the club so as to position their elbow as close as possible to their navel and/or the longitudinal axis of their spine as shown by the bold dotted line in FIG. 9. The position of the golfer as shown in FIG. 9 substantially corresponds with the position of the golfer shown in FIG. 5.

Figure 9:
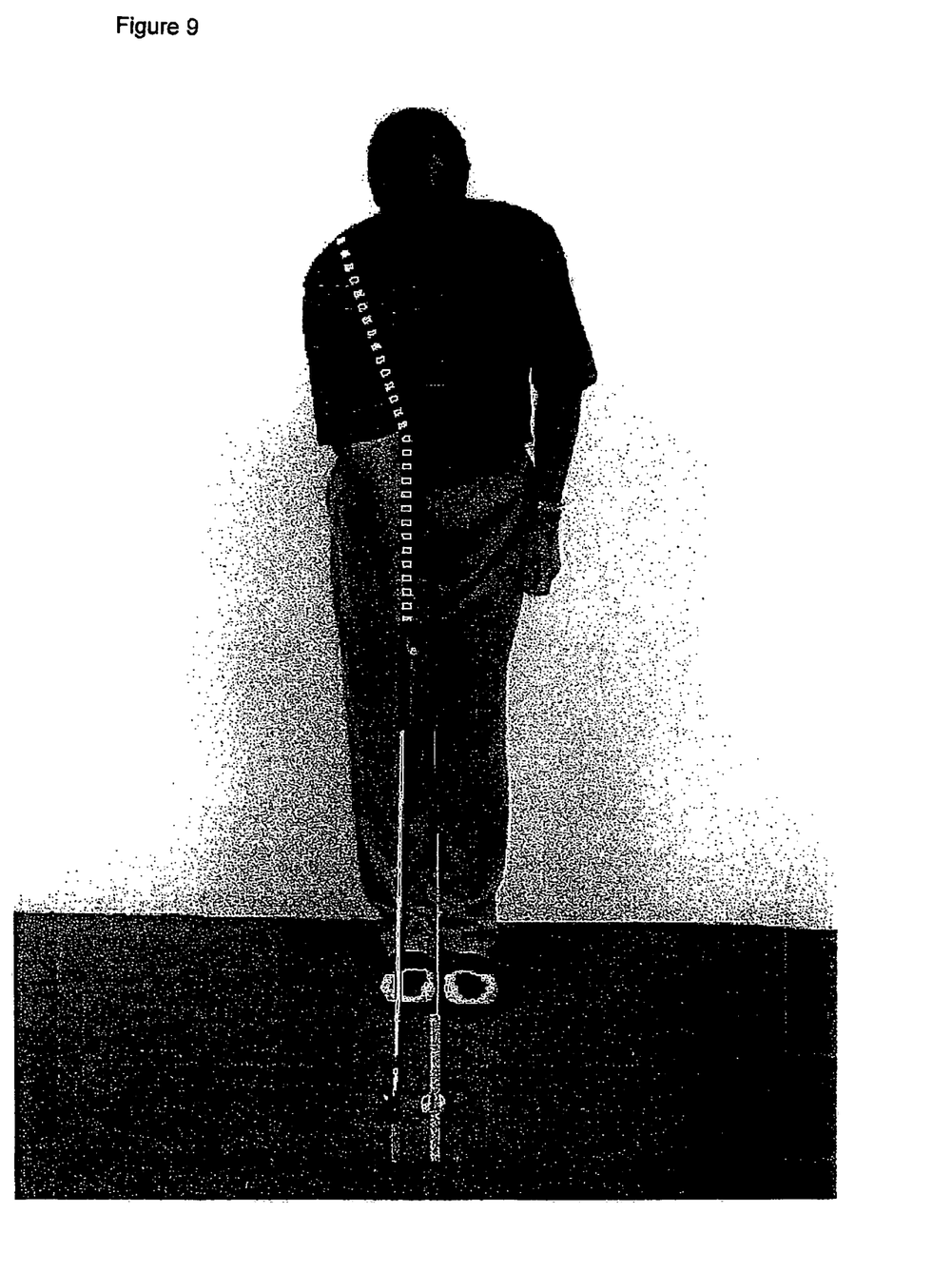
Figure 10:
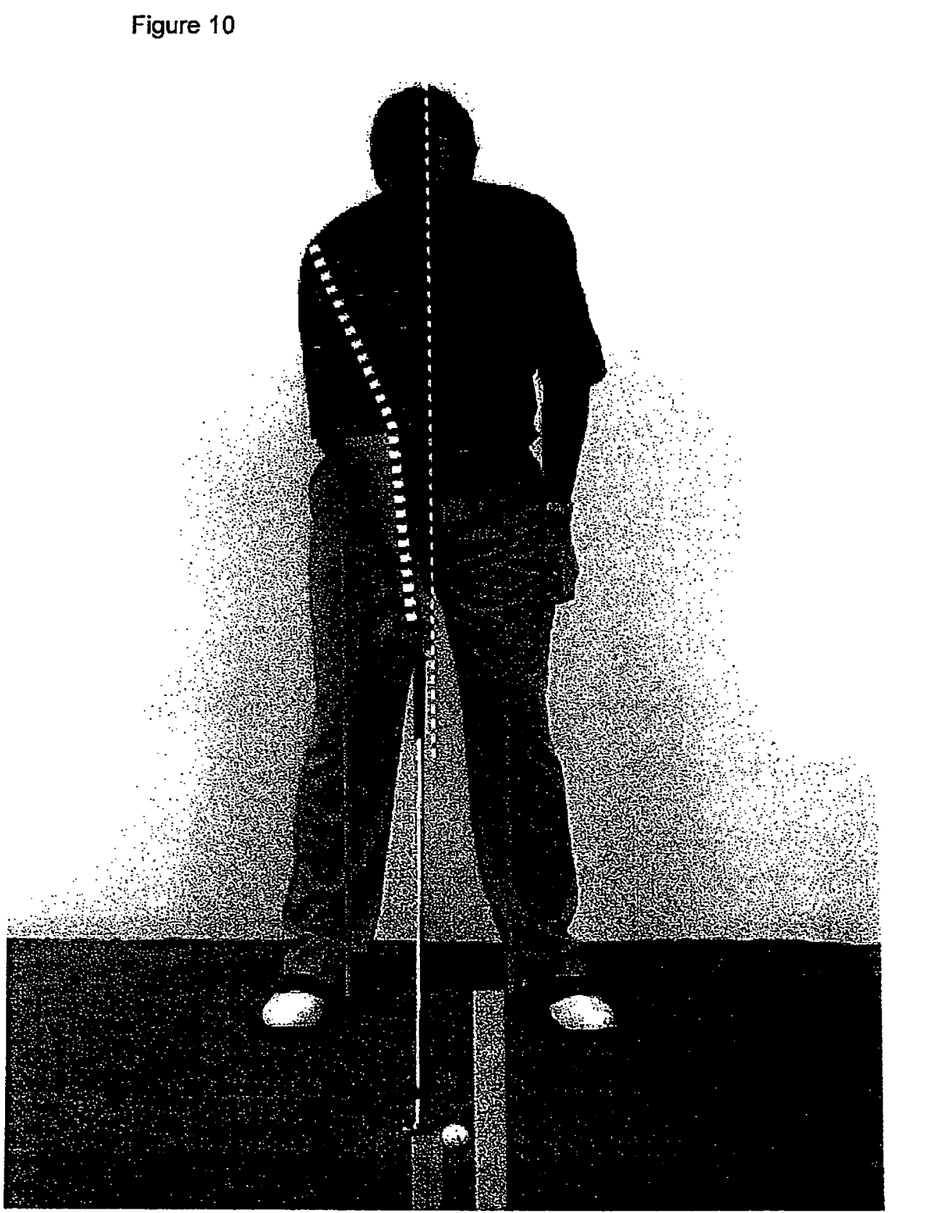

From the position shown in FIG. 9, the next step is then either for the golfer to re-grip the club using a convention grip or alternatively to spread their feet as shown in FIG. 10 while maintaining the orientation of their right arm. The spacing of the golfer's feet will depend on the type of club being used. In the situation where the club being used is an iron such as a five iron, the feet are separated by a distance such that the inside arch of each foot approximately aligns with the hip joint of each leg as can be seen by the vertical lines shown in FIG. 10.

Figure 11:
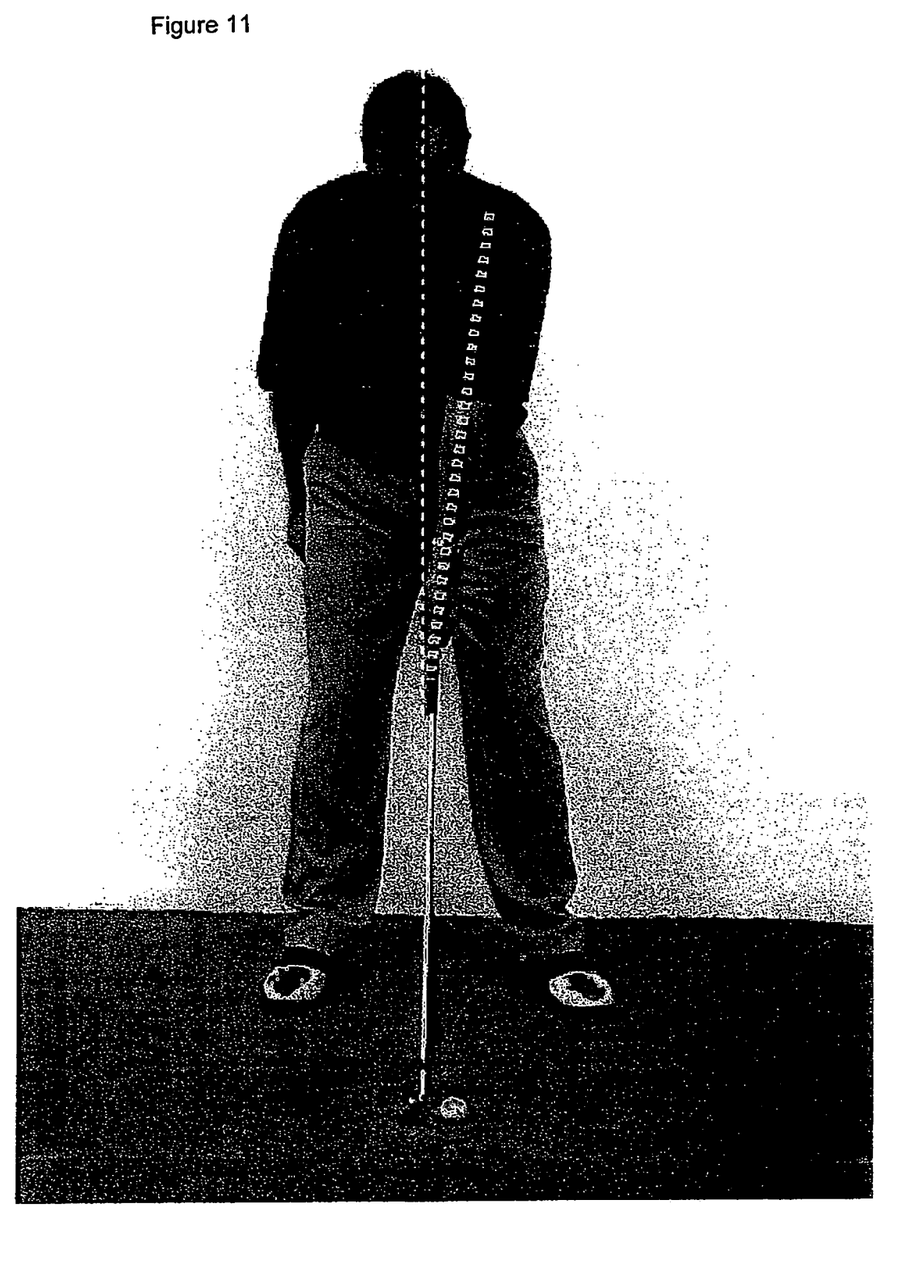
Figure 12:
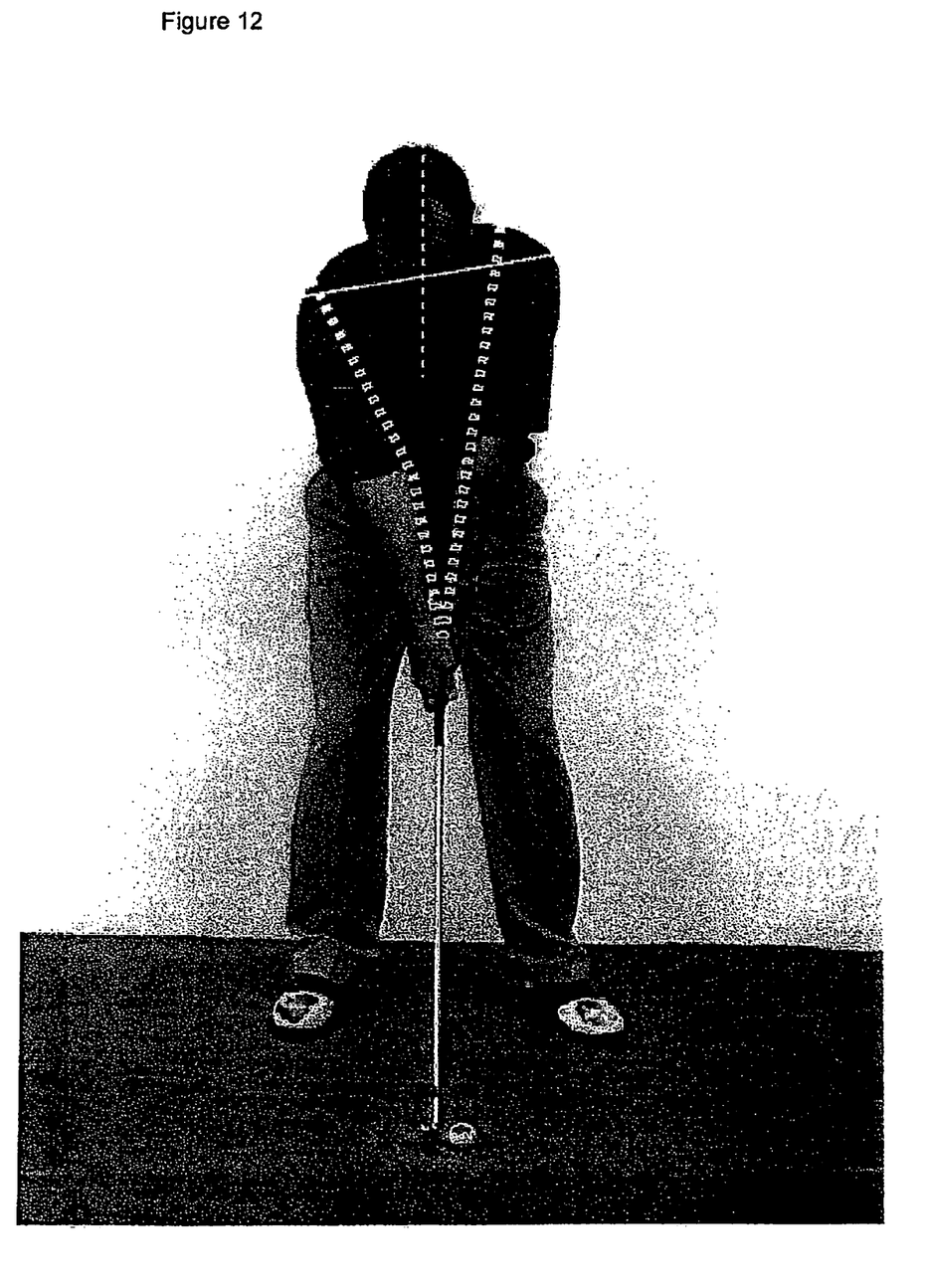

From the position shown in FIG. 10, the golfer can then re-grip the club by placing their left hand on top of the club shaft as shown in FIG. 11, and re-gripping the club with their right hand lower on the shaft as shown in FIG. 12. It is important, that when the right hand re-grips the club, the right arm is oriented to keep the right elbow as close as possible to the navel or spin of the golfer. Once the stance shown in FIG. 12 has been attained the take away and down swing can then be carried out in the usual manner.

The sequence of steps shown in FIGS. 8 to 12 may be summarized as follows:

i) positioning the striking surface of the club behind the ball and facing the target (see FIG. 8);
ii) step up to the ball with both feet side-by-side and orienting the right arm (see FIG. 9);
iii) separating feet (see FIG. 10); and
iv) re-gripping the club with both hands and maintaining orientation of the right arm (see FIGS. 11 and 12).

The sequence of steps shown in FIGS. 3 to 7 is similar to that shown in FIGS. 8 to 12. However, the order in which the golfer re-grips the club and separates his feet is reversed.

A person skilled in the art of the present invention will appreciated that many modifications and variations may be made to the preferred embodiment described above without departing from the spirit and scope of the present invention.

For example, although the FIGS. 1 to 7 show the sequence of the steps being carried out with a driver and FIGS. 8 to 12 show the sequence of steps being carried out with middle iron such as a 5 or 6 iron, it will be appreciated that the same sequence of steps can be followed using any club or for playing any shot including: driving, fairway shots, bunkers shots, pitching, chipping and putting.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic device comprising:
a computer arranged to present steps of a method to a viewer or listener for positioning a person in a stance for hitting a golf ball along an intended path toward a target, the steps of the method being presented by the electronic device include the following steps which are carried out before swinging a golf club in preparation of hitting the golf ball:
(a) holding an uppermost end of a golf club in only one hand, the one hand being the hand used by the person as a lower hand in a conventional golf grip, in the case of a right handed golfer said hand will be the right hand and in the case of a left handed golfer said hand will be the left hand;
(b) positioning the club such that a striking surface of the club faces the target and is spaced behind the ball relative to the target;
(c) placing both feet side-by-side at a distance from the ball and lateral to the intended path, wherein a front foot closest to the target is located substantially forward of the ball and a back foot furthest from the target is located substantially rearward of the ball such that the centre of the back foot approximately aligns with the centre of the spacing between the striking surface of the golf club and the ball;
(d) orienting the person's arm by which the club is held so as to locate the person's elbow of the arm as close as possible to the navel and/or spine of the person;
(e) re-gripping the club with both hands using a conventional golf grip, wherein the hand holding the club during steps (a) to (d) is moved approximately one hand size down the golf club and the other hand now grips the uppermost end of the shaft, in the case of a right handed golfer said other hand is a left hand and in the case of a left handed golfer the other hand is a right hand; and
(f) moving said feet apart so as to locate the front foot further forward of the ball and said back foot further rearward of the ball prior to swinging the club;
wherein steps (b) to (d) are carried out while holding the uppermost end of the golf club in said one hand i.e. the lower hand of a conventional golf grip, and wherein the orientation of the person's arm according to step (d) is substantially maintained after the club is re-gripped according to step (e) and until the beginning of a golf swing.

2. The electronic device according to claim 1, wherein the spacing between the club face and the ball according to step (b) of the presented method is approximately equal to the distance between a navel of the person and a vertical axis extending through a hip joint of a person.

3. The electronic device according to claim 1, wherein the step of positioning the club behind the ball relative to the target according to step (b) of the presented method includes positioning the club over a range from 3 to 15 cm behind the ball.

4. The electronic device according to claim 1, wherein the step of positioning the club behind the ball relative to the target according to step (b) of the presented method includes positioning the club over a range from 3 to 12 cm behind the ball.

5. The electronic device according to claim 1, wherein the step of positioning the club behind the ball relative to the target according to step (b) of the presented method includes positioning the club over a range from 3 to 5 cm behind the ball.

6. The electronic device according to claim 1, wherein placing both feet side-by-side in accordance with step (c) of the presented method involves placing the person's feet together.

7. The electronic device according to claim 1, wherein the person's hip joint furthest from the ball is approximately aligned with the club head and the person's navel is approximately aligned with the ball during step (c) of the presented method.

8. The electronic device according to claim 1, wherein when the person orients their arm so that their elbow is positioned as close as possible to their navel and/or spine in accordance with step d) of the presented method, the person's thumb of their hand holding the club points toward the ball.

9. The electronic device according to claim 1, wherein when carrying out step (e) of the presented method, the arm of the upper hand used for gripping the upper end of the club is held relatively straight so that the shaft of the club and the person's arm are co-planer.

10. The electronic device according to claim 1, wherein when moving the person's feet apart according to step (f) of the presented method, the feet are spread by a distance at least as wide as the person's shoulders.

11. The electronic device according to claim 10, wherein an inside arch of each foot is located outside the shoulder joint of the person during step (f) of the presented method.

* * * * *

UNITED STATES PATENT AND TRADEMARK OFFICE
CERTIFICATE OF CORRECTION

PATENT NO. : 7,744,481 B2
APPLICATION NO. : 11/371458
DATED : June 29, 2010
INVENTOR(S) : Canney Page 1 of 2

It is certified that error appears in the above-identified patent and that said Letters Patent is hereby corrected as shown below:

Drawings
Sheet 3, replace Figure 3 with the figure depicted below, wherein "Line 4" has been replaced by --Line A--

Figure 3

Signed and Sealed this

Second Day of November, 2010

David J. Kappos
*Director of the United States Patent and Trademark Office*

Column 3
Line 36, change "the club an end" to --the upper end--
Line 66, change "be" to --by--

Column 4
Line 43, change "is useful" to --it is useful to--
Line 57, change "left" to --left hand--
Line 65, change "golfer" to --golfer,--
Line 66, change "shoulder" to --shoulder,--

Column 5
Line 45, change "iron" to --iron,--

Column 8
Line 10, change "step d)" to --step (d)--